United States Patent Office 3,006,883
Patented Oct. 31, 1961

3,006,883
METHOD OF PRODUCING A PHENOL FORMALDEHYDE ACETONE RESIN
Emile A. Cambron, Cornwall, Ontario, Canada, assignor to Howard Smith Paper Mills Limited, Montreal, Quebec, Canada
No Drawing. Filed Oct. 24, 1958, Ser. No. 769,320
3 Claims. (Cl. 260—43)

The purpose of this invention is to prepare a new and valuable thermosetting resin.

It is a further object of this invention to prepare a resin having good flexibility while retaining good bonding, good flexural strength, and good resistance to water absorption and being suitable for the production of thermosetting laminates.

I have discovered that acetone, together with phenol and formaldehyde, can, under rigidly controlled conditions, lead to a valuable thermosetting resin having high flexibility, good bonding strength, and good water absorption.

It is known to the art that acetone will react with formaldehyde to form methylol derivatives of acetone which will further undergo polymerization leading to thermoplastic low molecular weight polymers.

An example of acetone formaldehyde polymerization is as follows:

$$nCH_3COCH_3 + 2nHCHO \longrightarrow nCH_2(OH)-CH-\overset{O}{\underset{\|}{C}}-CH_3$$
$$\overset{|}{CH_2OH}$$

$$\longrightarrow nCH_2(OH)-\underset{\|}{\overset{O}{C}}-\overset{\|}{\underset{CH_2}{C}}-CH_3 + nH_2O$$

$$\longrightarrow [-CH_2-\underset{\|}{\overset{O}{C}}-\overset{\|}{\underset{CH_2}{C}}-CH_2-]_n + nH_2O$$

In addition to $n$ moles of acetone reacting with $2n$ moles of formaldehyde, $n$ moles of acetone will also react with $n$ moles and also with $3n$ moles of formaldehyde, leading to resin formation. These polymers have poor mechanical properties and poor heat resistance.

It has been suggested that phenol or a phenolic resin be added to these polymers to attain better heat stability. However, results obtained with these resins, although to some extent heat hardenable, are not truly thermosetting. Thus, if such a resin is used in paper or cloth based laminates, the resulting products when drawn hot from the press, blister and delaminate as a result of the rapid escape of water vapor from the still soft material. These resins have not been found to be commercially acceptable.

I have found that phenol or cresol or mixtures thereof can be introduced into the reaction, to form a copolymer at the stage where the methylol derivatives of acetone are substantially in the monomeric form.

Due to the greater reactivity of the alpha-hydrogen of the phenol molecule over the alpha-hydrogen of the acetone molecule, the formation of acetone-formaldehyde polymers may be minimized by adding the phenol with the acetone.

However, due again to the difference in reactivity of their respective alpha-hydrogen atoms the earlier the acetone is introduced in the reaction the higher the yield. I have found that the best yields of a satisfactory resin are obtained by initiating the reaction between acetone and formaldehyde to yield a substantially monomeric product under mildly alkaline conditions and then introducing phenol equimolecularly proportioned to the acetone, before the substantially monomeric product has polymerized into the undesired inferior quality acetone formaldehyde resin.

*Example 1*

The following materials were used in preparing a laminating resin:

|  | Moles |
|---|---|
| 581 gm. acetone | 10.00 |
| 665 gm. phenol | 7.06 |
| 166 gm. cresol (55–60% meta) | 1.53 |
|  | 8.59 |
| 3060 gm. 37% formaldehyde | 37.80 |
| 26.6 gm. sodium carbonate anhydrous | 0.25 |
| 618 gm. methyl alcohol | 19.25 |

The acetone is introduced into a reaction vessel fitted with an agitator and a reflux condenser. The acetone is brought to reflux and 1020 gm. of formaldehyde (12.60 moles) and 2.66 gm. of sodium carbonate (0.025 mole) are gradually added separately such that 10 equal portions of each are added at 10 minute intervals.

After an additional 10 minutes' reflux following the 10th addition of formaldehyde 665 gm. phenol, 166 gm. cresol and 2.66 gm. (0.025 mole) of sodium carbonate are added and the resultant solution is refluxed for 30 minutes.

This is followed by 1020 gm. of formaldehyde (12.60 moles) and 6.10 gm. of sodium carbonate (0.057 mole) which are gradually added separately such that 5 equal portions of each are added at 10 minute intervals. Further formaldehyde, 1020 gm. (12.60 moles) and catalyst, 7.59 gm. of sodium carbonate (0.072 mole), are then added and reflux carried for a period of 60 minutes. An additional 7.59 gm. of sodium carbonate (0.072 mole) is added and the resultant solution is refluxed for 20 minutes.

The resin is then distilled under high vacuum to a temperature of 85° C. After the water has been removed, 618 gm. of methanol are added, giving a clear, viscous laminating varnish suitable for the production of high quality thermosetting paper or cloth laminates.

This varnish was used for impregnating 60 lb. kraft paper (basis 3,000 sq. ft.) to a resin content of 33% and a volatile content of 7.9%, and the resultant material laminated by pressing for forty-five minutes at 160° C. under 800 p.s.i. with the following results.

Water absorption of predried sample during 24 hours' immersion in distilled water (A.S.T.M.).

D570–54T), percent:
| | |
|---|---|
| ⅛″ | 2.27 |
| ½″ | 0.90 |

Flexural strength (p.s.i.):
| | |
|---|---|
| M.D. | 27,930 |
| C.D. | 21,360 |

M. of E. flex (p.s.i.×10⁶):
| | |
|---|---|
| M.D. | 1.89 |
| C.D. | 1.23 |

Compression strength flat (p.s.i.) — 44,360

Impact, Izod (ft. lb./in. notch):
| | |
|---|---|
| M.D. | 0.70 |
| C.D. | 0.61 |

Bonding strength, lbs. (A.S.T.M. D229–49) — 910
Steel ball _____inches__ 0.315

Heat resistance: Can be drawn hot from the press (160° C.) without blisters. Shows no surface injury and no blistering when subjected to A.S.T.M. (D1300–53T) high-temperature test.

Used in a decorative laminate with printed melamine impregnated surface sheet shows no surface injury and no blistering when subjected to A.S.T.M. (D1300–53T) high-temperature test.

Cigarette-burn test: 201 seconds (A.S.T.M. D1300–53T).

What I claim is:

1. A method of producing a thermosetting laminating resin comprising reacting acetone and formaldehyde in alkaline solution to form a monomeric monomethylol derivative thereof, and reacting said derivative with phenol and thereafter with additional formaldehyde to form the thermosetting resin.

2. A method according to claim 1 wherein approximately 1.0 mole of acetone and 1.0–1.5 moles of formaldehyde are reacted in alkaline solution to form the monomeric monomethylol derivative.

3. A method according to claim 2 wherein phenol in approximate equimolecular proportion with the acetone is reacted with said derivative.

References Cited in the file of this patent

UNITED STATES PATENTS

| | | |
|---|---|---|
| 2,191,802 | Novotny et al. | Feb. 27, 1940 |
| 2,206,906 | Loos | July 9, 1940 |
| 2,538,884 | Schrimpe | Jan. 23, 1951 |